(No Model.)
G. D. BURTON.
ELECTRIC HEATING APPARATUS.
No. 521,099. Patented June 5, 1894.
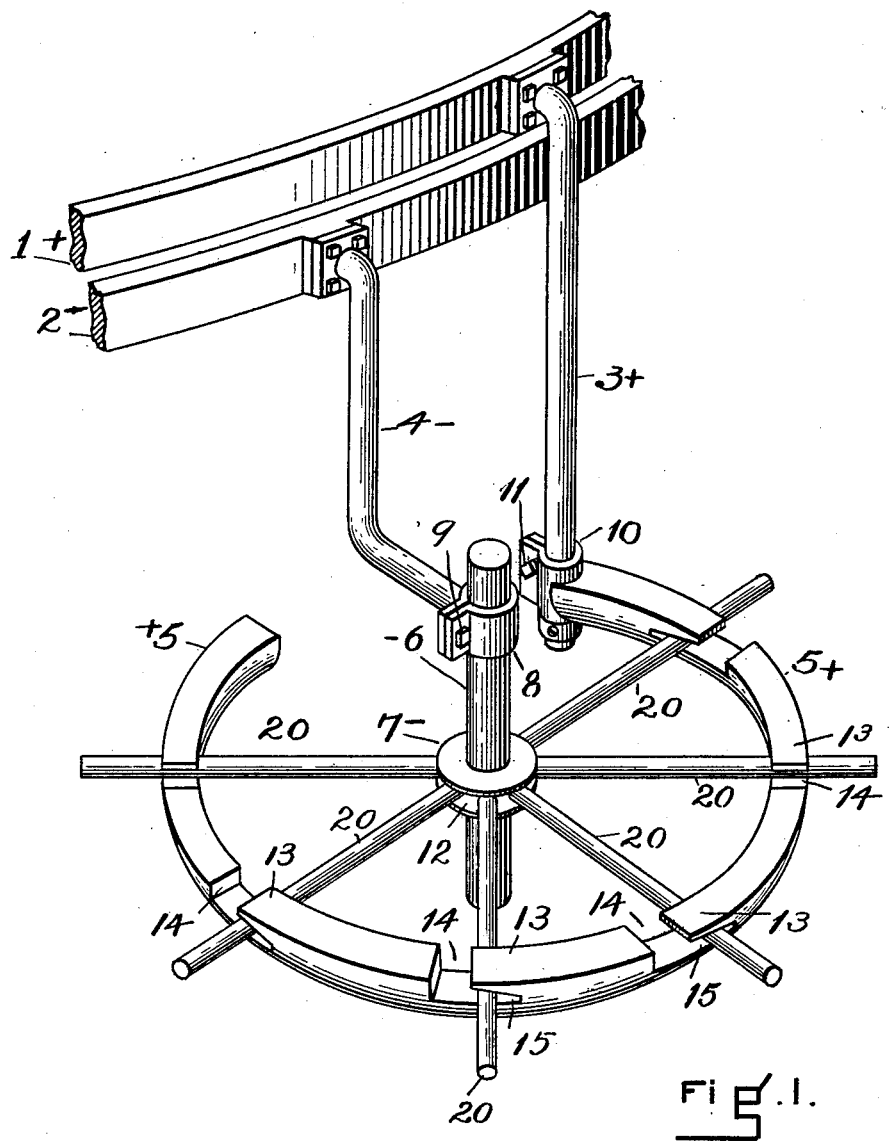
Fig. 1.
Fig. 2.
Fig. 3.
WITNESSES.
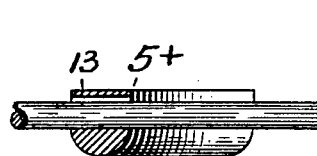
INVENTOR:
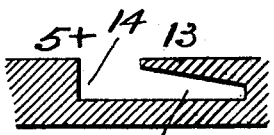

UNITED STATES PATENT OFFICE.

GEORGE D. BURTON, OF BOSTON, MASSACHUSETTS.

ELECTRIC HEATING APPARATUS.

SPECIFICATION forming part of Letters Patent No. 521,099, dated June 5, 1894.

Application filed August 11, 1893. Serial No. 482,935. (No model.)

*To all whom it may concern:*

Be it known that I, GEORGE D. BURTON, of Boston, in the county of Suffolk and State of Massachusetts, have invented a new and useful Improvement in Electric Heating Apparatus, of which the following is a specification.

My invention relates to apparatus for heating by electricity, and it consists in certain new and useful constructions and combinations of parts thereof, substantially as hereinafter described and claimed.

In the drawings:—Figure 1 represents a perspective view of part of an electric converter with my heating apparatus attached thereto. Fig. 2 represents parts of my heating apparatus, the central part being in elevation and the outer portion thereof in section, a rod to be heated being shown in connection therewith. Fig. 3 is a cross section through one of the metal holding jaws. Fig. 4 represents a central hub constituting a part of this heating apparatus having sockets or notches instead of the groove as shown in the other figures.

The outer rings, in part, of an electric converter, such as is shown and described in the patent granted to Burton, Eddy and Briggs May 17, 1892, No. 475,232, is shown at 1+ and 2—. From these rings the arms 3+ and 4— conduct the electric current to the ring-shaped conductor, 5+ and to the central shaft, 6—, and its hub, 7—, substantially as shown. The shaft 6— sets in the sleeve, 8, on the arm 4—, which has a clamp screw, 9, that closes the sleeve on the shaft and secures it in any vertical position desired. The conductor, 5+, is supported on the conducting arm, 3+, by means of the sleeve, 10, which is provided with the clamp screw, 11, by which it may be closed on the conductor 3+ in any desired position, either vertical or horizontal. The conductor 5+ surrounds the hub 7—, and by swinging the conductor horizontally it may be drawn away from the hub, or brought nearer to it at all points except sleeve 10. A circumferential V-shaped groove, 12, is cut in the periphery of the hub 7— and is made inclined or V shaped on its sides so as to embrace the end of any rod forcibly thrust into it. The conductor 5+ is provided with a series of jaws, 13, formed by cutting a slot, 14, radially across the conductor and then undercutting another slot, 15, circumferentially from the bottom part of slot 14. These inclined jaws, 13, are fitted to grasp different sized rods forced or jammed into the grooves 15. A series of these jaws 13 with their undercut slots of different breadths is provided at intervals around the periphery of the conductor, 5+, so as to receive different sized rods, the V-shaped groove in the central hub 7— being wide enough to receive any one of these rods. The circumferential shape of the groove 12 in the hub also accommodates itself to any angle at which the conductor 5+ may be swung, so that the rods, 20, 20, will obtain as good a contact when thrust into the groove 12 at one angle as at another. By thrusting a rod, 20, forcibly into the groove 12 and then pressing it sidewise under the jaw 13, the binding action of the latter will not only make a good electrical contact but it will hold the end of rod in the groove 12 with a good electrical contact. This is especially true when the other parts of the conductor 5+ are swung out farther from the hub 7— than the sleeve 10, because sidewise pressure of the rod under the jaw 13 then tends to crowd the rod endwise toward the hub 7—.

Instead of employing a circumferential groove, 12, in the periphery of the hub 7—, I might employ a series of holes or notches, but I prefer the groove as shown, from its greater self-adjustability at different angles at which the rods may be inserted.

The heater is operated by thrusting the bar, 20, into the groove, 12, and crowding it sidewise into the groove, 15, under the jaw 13. This operation can be performed very rapidly and will make good electrical contact at both ends of the part of the bar to be heated, which is of great importance where the operator is heating a series of bars at the same time and replacing a heated one by a fresh one every time he withdraws it, as in the case of a blacksmith making horseshoe nails, for instance, where he has to handle the iron rapidly. If the conductor 5+ is not in the position to heat the right length of bar between its jaw and the central hub 10, it can be swung outward or inward until one of the jaws is brought the right distance from the central hub. It may also be so adjusted that each jaw will heat a different length of rod from every other one, and a series of different lengths of rods may be heated at the same time.

What I claim as new and of my invention is—

1. In an electric heater, the combination of a central hub attached to one terminal of the converter, and provided with means for receiving one end of the rod to be heated, and an arc-shaped conductor attached to the other terminal of the converter arranged to swing radially toward and away from said central hub, and provided with a jaw arranged to hold and make contact with another part of the rod to be heated, substantially as described.

2. In an electric heater, the combination of a central hub attached to one terminal of the converter and provided with means for receiving one end of the rods to be heated, and an arc-shaped conductor attached to the other terminal of the converter, arranged to swing radially toward and away from said central hub and provided with a series of jaws arranged to hold and make contacts with other parts of the rods to be heated, substantially as described.

3. In an electric heater, the combination of a central hub attached to one terminal of the converter and provided with a V-shaped circumferential slot for receiving one end of the rods to be heated, and an arc-shaped conductor attached to the other terminal of the converter, arranged to swing radially toward and away from said central hub and provided with a series of jaws arranged to hold and make contact with another part of the rods to be heated, substantially as described.

4. In an electric heater, the combination of a central hub, attached to one terminal of the converter and provided with a V-shaped circumferential slot for receiving one end of the rods to be heated, and an arc-shaped conductor attached to the other terminal of the converter, arranged to swing radially toward and away from said central hub, and provided with a series of jaws under cut circumferentially into the substance of the conductor, substantially as described.

5. In an electric heater, the combination of a central hub attached to one terminal of the converter and provided with means for receiving one end of a rod to be heated, and an arc-shaped conductor attached to the other terminal of the converter and adapted to swing away from and toward said central hub, said conductor being provided with a series of under cut tapering jaws, substantially as set forth.

GEO. D. BURTON.

Witnesses:
   E. F. PHILIPSON,
   GEO. F. MOORE.